(12) United States Patent
Kotani

(10) Patent No.: US 10,630,947 B2
(45) Date of Patent: Apr. 21, 2020

(54) PROJECTION APPARATUS WITH ILLUMINATION FUNCTION AND IMAGE PROJECTION DISPLAY FUNCTION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Junji Kotani, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/120,940

(22) Filed: Sep. 4, 2018

(65) Prior Publication Data

US 2019/0075277 A1    Mar. 7, 2019

(30) Foreign Application Priority Data

Sep. 7, 2017    (JP) .................................. 2017-172290

(51) Int. Cl.
  *G03B 21/14*    (2006.01)
  *H04N 9/31*    (2006.01)
(52) U.S. Cl.
  CPC .......... *H04N 9/3182* (2013.01); *G03B 21/14* (2013.01); *H04N 9/3155* (2013.01); *H04N 9/3158* (2013.01); *H04N 9/3185* (2013.01)
(58) Field of Classification Search
  CPC .... G03B 21/14; G03B 21/005; G03B 21/006; H04N 9/31; H04N 9/3102; H04N 9/3105; H04N 9/3108; H04N 9/3155; H04N 9/3182

USPC ............................................. 353/31, 34, 37
See application file for complete search history.

(56) References Cited

U.S. PATENT DOCUMENTS

| | | | |
|---|---|---|---|
| 9,158,146 B2 * | 10/2015 | Kinebuchi | H04N 9/31 |
| 9,332,237 B2 * | 5/2016 | Shinha | H04N 9/3111 |
| 2016/0025327 A1 * | 1/2016 | Abe | G03B 21/204 |
| | | | 348/744 |

FOREIGN PATENT DOCUMENTS

JP    2014021428 A    2/2014

* cited by examiner

*Primary Examiner* — William C. Dowling
(74) *Attorney, Agent, or Firm* — Rossi, Kimms & McDowell LLP

(57) ABSTRACT

A projection apparatus that is capable of reducing difference in color tones between diffused light with a high diffusion degree and non-diffused light with a low diffusion degree. An irradiation unit irradiates with light including color components. A modulation unit modulates the light irradiated by the irradiation unit. A diffusion unit diffuses and outputs the light incident from the modulation unit. A color setting unit sets up a target color of the light output from the diffusion unit. A controller controls the irradiation unit and the modulation unit. The controller controls at least one of the irradiation unit and the modulation unit according to variation of characteristics of the diffusion unit so that difference between a color of the light diffused by the diffusion unit and the target color will become small.

11 Claims, 10 Drawing Sheets

FIG. 7A

| APPLIED VOLTAGE | B-TRANS-MITTANCE | G-TRANS-MITTANCE | R-TRANS-MITTANCE | B-DIFFU-SIVITY | G-DIFFU-SIVITY | R-DIFFU-SIVITY |
|---|---|---|---|---|---|---|
| v0 | 2 | 3 | 4 | 98 | 97 | 96 |
| v1 | 5 | 8 | 13 | 95 | 92 | 87 |
| v2 | 10 | 20 | 32 | 90 | 80 | 68 |
| v3 | 23 | 37 | 48 | 77 | 63 | 52 |
| v4 | 36 | 48 | 57 | 64 | 52 | 43 |
| v5 | 49 | 59 | 66 | 51 | 41 | 34 |
| v6 | 62 | 70 | 75 | 38 | 30 | 25 |
| v7 | 75 | 84 | 85 | 25 | 16 | 15 |

UNIT: %

FIG. 7B

| APPLIED VOLTAGE | TRANSMITTED-LIGHT ORIENTED CORRECTION VALUE | | | DIFFUSED-LIGHT ORIENTED CORRECTION VALUE | | |
|---|---|---|---|---|---|---|
| | B | G | R | B | G | R |
| v0 | 1.00 | 0.67 | 0.50 | 0.98 | 0.99 | 1.00 |
| v1 | 1.00 | 0.63 | 0.38 | 0.92 | 0.95 | 1.00 |
| v2 | 1.00 | 0.50 | 0.31 | 0.76 | 0.85 | 1.00 |
| v3 | 1.00 | 0.62 | 0.48 | 0.68 | 0.83 | 1.00 |
| v4 | 1.00 | 0.75 | 0.63 | 0.67 | 0.83 | 1.00 |
| v5 | 1.00 | 0.83 | 0.74 | 0.67 | 0.83 | 1.00 |
| v6 | 1.00 | 0.89 | 0.83 | 0.66 | 0.83 | 1.00 |
| v7 | 1.00 | 0.89 | 0.88 | 0.60 | 0.94 | 1.00 |

FIG. 7C

| LIGHT INCIDENT AREA | B-REFLECTANCE | G-REFLECTANCE | R-REFLECTANCE |
|---|---|---|---|
| AREA 901 | 100 | 100 | 100 |
| AREA 902 | 98 | 102 | 103 |

UNIT: %

FIG. 7D

| LIGHT INCIDENT AREA | B-CORRECTION VALUE | G-CORRECTION VALUE | R-CORRECTION VALUE |
|---|---|---|---|
| AREA 901 | 1.00 | 1.00 | 1.00 |
| AREA 902 | 1.00 | 0.96 | 0.95 |

*FIG. 8*

| NUMBER | R-GAIN | G-GAIN | B-GAIN |
|---|---|---|---|
| 0 | 1.0 | 1.0 | 1.0 |
| 1 | 1.0 | 0.0 | 0.0 |
| 2 | 0.0 | 1.0 | 0.0 |
| 3 | 0.0 | 0.0 | 1.0 |
| 4 | 0.0 | 1.0 | 1.0 |
| 5 | 1.0 | 0.0 | 1.0 |
| 6 | 1.0 | 1.0 | 0.0 |

PROJECTION APPARATUS WITH ILLUMINATION FUNCTION AND IMAGE PROJECTION DISPLAY FUNCTION, CONTROL METHOD THEREFOR, AND STORAGE MEDIUM STORING CONTROL PROGRAM THEREFOR

BACKGROUND OF THE INVENTION

Field of the Invention

The present invention relates to a projection apparatus, a control method therefor, and a storage medium storing a control program therefor, and particularly, relates to a projection apparatus with an illumination function and an image projection display function, a control method therefore, and a storage medium storing a control program therefor.

Description of the Related Art

Conventionally, there is a known projection apparatus that modulates light from a light source according to an image signal and projects the modulated light onto a projected plane like a screen to display an image by reflected light. Moreover, a projection apparatus that uses light from a light source as illumination is also appearing in recent years. For example, Japanese Laid-Open Patent Publication (Kokai) No. 2014-021428 (JP 2014-021428A) discloses a technique of a projection apparatus having a light modulation unit that converts light emitted from a light source into modulated light prescribed by an image signal and a polymer dispersed liquid crystal that adjusts a diffusion degree of the light exited from the light modulation unit. Hereinafter, the polymer dispersed liquid crystal is called a PDLC. This technique is able to control the light so as to irradiate a wide area in a room by heightening the diffusion degree of the ejected light by the PDLC, for example. Moreover, a projection image is displayed or a local area is illuminated (spotlight illumination) by lowering the diffusion degree of the ejected light, for example.

However, the spectral characteristics of the diffusivity and transmittance of the diffusion unit like a PDLC that adjusts the diffusivity of light are not flat in many cases. Accordingly, a color tone of the diffused light that illuminates a room with a high diffusion degree differs from a color tone of the transmitted light that is used in the image projection display or the spotlight illumination in many cases. The difference in the color tone causes a feeling of strangeness to a user who uses the projection apparatus while changing the diffusion degree, for example.

SUMMARY OF THE INVENTION

The present invention provides a projection apparatus, a control method therefor, and a storage medium storing a control program therefor, which are capable of reducing difference in color tones between diffused light with a high diffusion degree and non-diffused light with a low diffusion degree.

Accordingly, a first aspect of the present invention provides a projection apparatus comprising an irradiation unit configured to irradiate with light including a plurality of color components, a modulation unit configured to modulate the light irradiated by the irradiation unit, a diffusion unit configured to diffuse and output the light incident from the modulation unit, a color setting unit configured to set up a target color of the light output from the diffusion unit; and a controller configured to control the irradiation unit and the modulation unit. The controller controls at least one of the irradiation unit and the modulation unit according to variation of characteristics of the diffusion unit so that difference between a color of the light diffused by the diffusion unit and the target color will become small.

Accordingly, a second aspect of the present invention provides a control method for a projection apparatus equipped with an irradiation unit that irradiates with light including a plurality of color components, a modulation unit that modulates light irradiated by the irradiation unit, and a diffusion unit that diffuse and output light incident from the modulation unit, the control method comprising setting a target color of the light output from the diffusion unit; and controlling at least one of the irradiation unit and the modulation unit according to variation of characteristics of the diffusion unit so that difference between a color of the light diffused by the diffusion unit and the target color will become small.

Accordingly, a third aspect of the present invention provides a non-transitory computer-readable storage medium storing a control program causing a computer to execute the control method of the second aspect.

The present invention is capable of reducing the difference in the color tone between the diffused light with the high diffusion degree and the non-diffused light with the low diffusion degree low in the projection apparatus having the diffusion unit that changes the diffusion degree Further features of the present invention will become apparent from the following description of exemplary embodiments with reference to the attached drawings.

BRIEF DESCRIPTION OF THE DRAWINGS

FIG. 7A through FIG. 7D are views for describing color correction of the projector in FIG. 1.

FIG. 8 is a view for describing a color change setting method in step S106 in FIG. 4A.

DESCRIPTION OF THE EMBODIMENTS

Hereafter, embodiments according to the present invention will be described in detail with reference to the drawings. This invention is not limited to the following embodiments.

First, a using form of a projector 100 as a projection apparatus concerning the present invention will be described with reference to FIG. 1.

Figure 1:
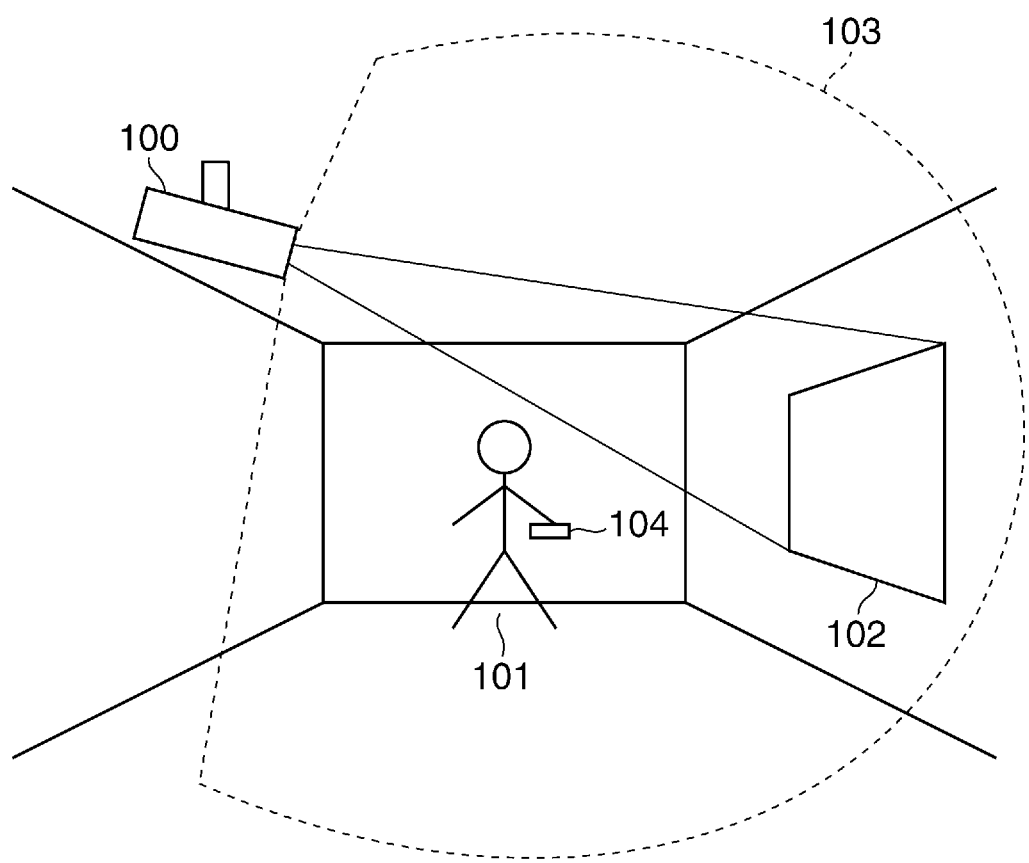
FIG. 1 is a view for describing a using form of a projector as a projection apparatus concerning the present invention.

As shown in FIG. 1, there is a user 101 in a room. The projector 100 optically projects an image signal input from a signal source (not shown) and displays a projection image (first light) 102 on a wall of the room in a projection mode. This enables the user 101 to appreciate the displayed projection image 102. In the meantime, the projector 100 outputs diffused light (second light) 103 that illuminates the inside of the room widely instead of displaying the projection image 102 in an illumination mode. Since the diffused light 103 illuminates the inside of the room, the user 101 is able to do various works. Moreover, the user 101 is able to instruct an operation to the projector 100 through an operation terminal 104. For example, the user 101 is able to instruct the projector 100 to switch between the projection mode in which the projection image 102 is displayed and the illumination mode in which the diffused light 103 is output.

The projector 100 in the first embodiment is constituted so that a transmission state and a diffusion state of a PDLC mentioned below will be alternative. In the first embodiment, a state where the PDLC is in the transmission state and the projection image 102 is displayed is referred to as the projection mode. Moreover, a state where a diffusion degree of the PDLC is higher than that in the projection mode and the diffused light 103 is output from the projection unit 205 is referred to as the illumination mode.

Figure 2:
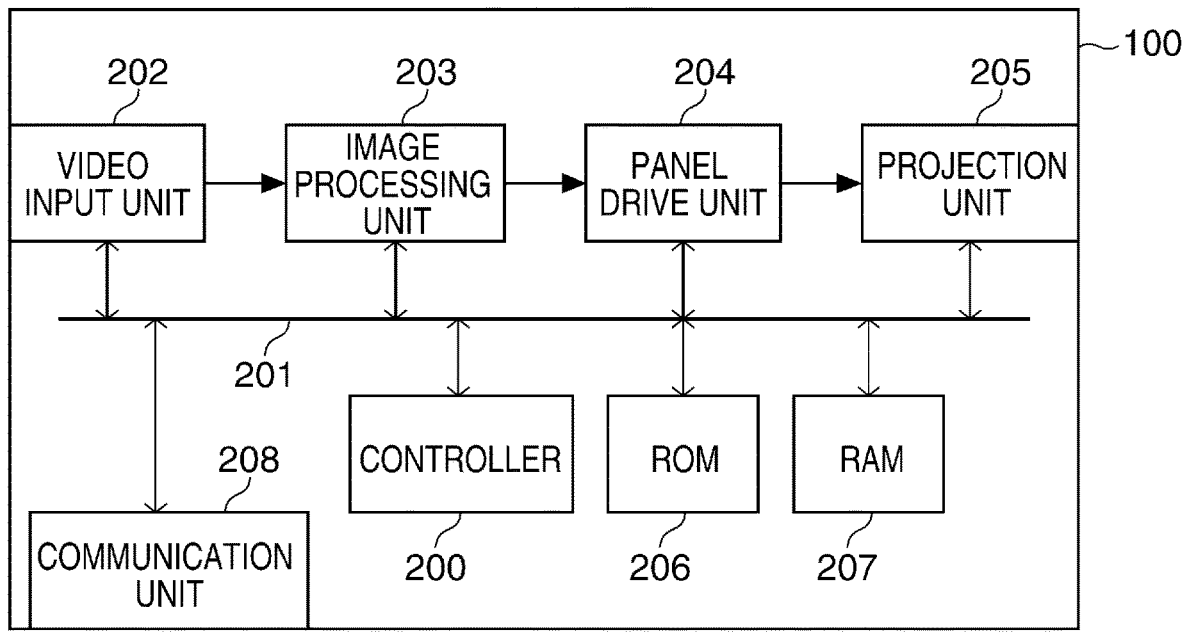
FIG. 2 is a block diagram showing a hardware configuration of the projector and a button arrangement of an operation terminal according to first and second embodiments.
Figure 2:
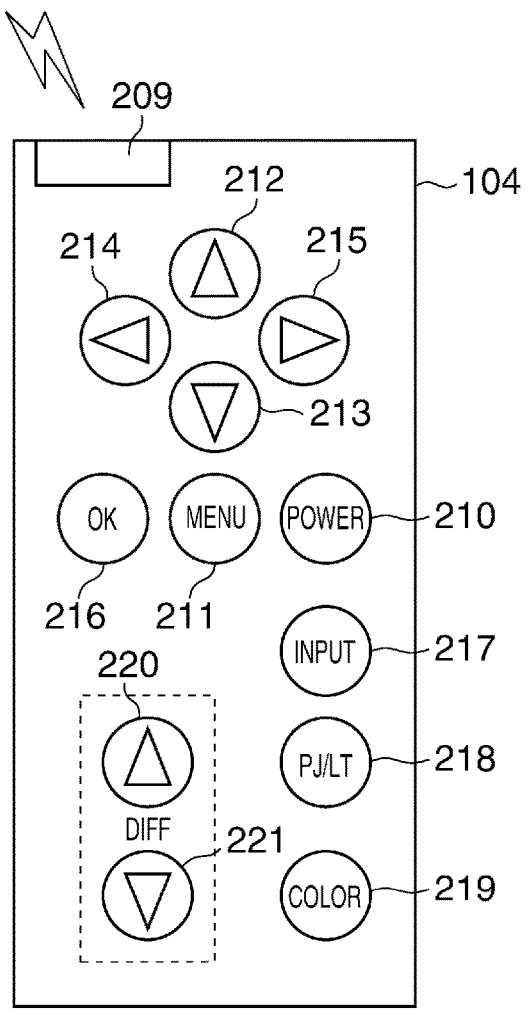

Hereinafter, a hardware configuration of the projector 100 will be described with reference to FIG. 2.

A controller 200 is constituted by a microcomputer and controls the projector 100 whole. Operations of the controller 200 will be mentioned later.

The controller 200 is communicatable with each section of the projector 100 through a bus 201.

The video input unit 202 inputs an image signal from a signal source (not shown), converts image data into a format that is processable by a latter circuit, and outputs it to an image processing unit 203. Moreover, the video input unit 202 is able to input an image instructed by the controller 200 and to output it after executing a similar process.

The image processing unit 203 applies an image processing to the image data received from the video input unit 202 according to an instruction from the controller 200. The image processing unit 203 is able to execute image processes, such as a tone conversion process, a frame thinning process, a frame interpolation process, a resolution conversion process, an image compositing process, a geometrical correction process, and a panel correction process. In the description, the tone conversion process means image processes, such as a gain correction, an offset correction, and a gamma correction. The geometrical correction process means image processes, such as a keystone correction and a curved surface correction. Particularly, the image processing unit 203 is able to superimpose the image instructed by the controller 200 on the output image as the image compositing processing. This enables a superimposed display of a menu image by which the user 101 sets the projector 100 as the projection image 102 on an output image, for example. Furthermore, the image processing unit 203 outputs an output image that was processed according to an instruction from the controller 200 or what superimposes the menu image etc. on the output image, as input image data to the panel drive unit 204.

Figure 3A:
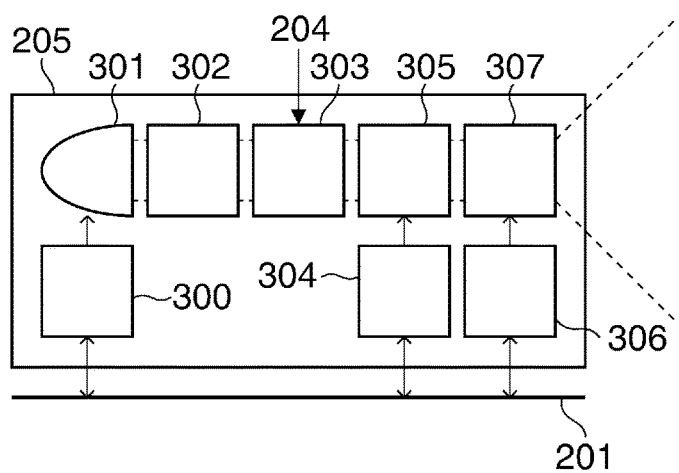
FIG. 3A, FIG. 3B, and FIG. 3C are block diagrams for describing configurations of optical systems in the projection unit in FIG. 2 according to first, third, and fourth embodiments, respectively.

The panel drive unit 204 converts the input image data from the image processing unit 203 into a driving signal for forming an image on a liquid crystal panel 303 shown in FIG. 3A in the projection unit 205 and outputs it to the liquid crystal panel 303. Moreover, the panel drive unit 204 is able to apply a gain to a tone value of the input image data for each of color components of R (Red), G (Green), and B (Blue) according to an instruction from the controller 200. For example, when the panel drive unit 204 applies the gain of 0.5 on the tone values of the input image data for the respective color components R, G, and B according to the instruction from the controller 200, the tone values of the image formed on the liquid crystal panel 303 will be 50%, and the light amount output from the projector 100 will be 50%.

The projection unit 205 includes a light source 301 mentioned later and the liquid crystal panel 303 etc. In the projection unit 205, the light from the light source 301 is modulated by the liquid crystal panel 303, is projected outside the projector 100 at the right side in the sheet and is displayed as an image.

A ROM 206 is a nonvolatile memory and stores program codes and data required in order that the controller 200 works. Moreover, the ROM 206 stores data required in order that the projector 100 works.

A RAM 207 is a volatile memory and is used as a work memory required in order that the controller 200 works.

A communication unit 208 consists of a wired communication module and a wireless communication module, sends and receives data with an external apparatus (not shown) through a wire (not shown) or over the radio. This enables the projector 100 to receive an inputted image or an instruction to the projector 100 from an external apparatus through the communication unit 208. Particularly, an operation instruction by the user 101 through the operation terminal 104 in FIG. 1 is receivable.

Next, the operation terminal 104 will be described with reference to FIG. 2. The operation terminal 104 is separated from the projectors 100, receives an operation instruction input by the user 101, and sends the operation instruction to the projector 100 by wireless communication through a terminal-side communication unit 209.

The operation terminal 104 has a power button 210, a menu button 211, an up button 212, a down button 213, a left button 214, a right button 215, and a decision button 216 for inputting an operation guidance from the user 101. Moreover, an input switching button 217 is provided for switching between a state where image data input from an external apparatus to the projector 100 is displayed as the projection image 102 and a state where image data stored in the projector 100 is displayed. Moreover, an illumination-projection mode switching button 218 is provided for switching between the projection mode and the illumination mode. Moreover, there is a color change button 219 for changing the color of the light (the projection image 102) in the projection mode or the diffused light 103 in the illumination mode so that difference from a target color set up by a color setting unit (not shown) will become small. However, the configuration of the operation terminal 104 mentioned above is an example and is not limited to this. For example, the user 101 may input an operation instruction for the projector 100 by using icons displayed on a smart phone by activating a dedicated application for the projector 100 that was installed in the smart phone.

It should be noted that buttons of the operation terminal 104 inside a broken line are used in a second embodiment mentioned later and are not used in the first embodiment.

Next, the detailed configuration of the projection unit 205 will be described with reference to FIG. 3A.

A light source controller 300 controls ON/OFF and a light amount of the light source 301 according to instructions from the controller 200 received via the bus 201.

The light source 301 emits the light for projecting an image or illuminating. The light source 301 employs a high-pressure mercury lamp, a halogen lamp, an LED (light emitting diode), or a laser light source. In addition, although the light source 301 employs a white light source in the first embodiment, it is not limited to this. For example, the light source 301 may consist of a plurality of light sources for color components of R, G, and B as with a fourth embodiment mentioned later. Alternatively, the light source 301 may consist of a blue light source and a fluorescent substance that converts blue light into yellow light.

An illumination optical system (illumination unit) 302 consists of a plurality of lenses that equalizes and collimates the light from the light source 301 to illuminate the liquid crystal panel 303. In a case where the light source 301 is a white light source, the illumination optical system 302 may include a color separation optical system. In such a case, the illumination optical system 302 is able to separate the white light from the light source 301 into the color components of RGB and to illuminate the liquid crystal panel 303 with each of the color components independently.

Pixel structures are arranged on the liquid crystal panel (a modulation unit) 303 in matrix. An image is formed on the liquid crystal panel 303 by modulating the incident light for every pixel according to the driving signal generated by the panel drive unit 204. The liquid crystal panel 303 may employ a transmissive liquid crystal panel or a reflective liquid crystal panel. The liquid crystal panel 303 may consist of a plurality of panel plates. For example, the liquid crystal panel 303 may consist of three panel plates including a liquid crystal panel corresponding to R light, a liquid crystal panel corresponding to G light, and a liquid crystal panel corresponding to B light. In such a case, a full color image of RGB will be formed when there is a color composition optical system (not shown) that composites the light components modulated by the respective liquid crystal panels.

An optical system controller 304 sends instructions to a projection optical system 305 mentioned later so as to enlarge or reduce the projection image 102 generated by the projection optical system 305, so as to adjust a focal point, and so as to shift a lens according to instructions from the controller 200 received via the bus 201.

The projection optical system (a projection unit) 305 projects the light modulated by the liquid crystal panel 303 outward as the projection image 102. The projection optical system 305 consists of a plurality of lenses and actuators for driving the lenses. The lenses are driven by the actuators according to instructions from the optical system controller 304 so as to enlarge or reduce the projection image 102, so as to adjust a focal point, and so as to shift a lens.

A diffusion unit controller 306 sends instructions to a diffusion unit 307 mentioned later for controlling the diffusion degree of the diffusion unit 307 according to instructions from the controller 200 received via the bus 201.

In the first embodiment, the diffusion unit 307 is a transmission-diffusion unit that diffuses at least a part of light (the projection image 102) projected from the projection optical system 305 and transmits light other than the diffused light. In the first embodiment, a polymer dispersed liquid crystal (PDLC) that controls a ratio of diffused light and transmitted light according to a voltage applied is used as the diffusion unit 307. That is, when the projector 100 controls the voltage applied to the diffusion unit 307 so as to put the PDLC into the transmission state, the light from the projection optical system 305 passes through the diffusion unit 307 as-is and is displayed as the projection image 102. In the meantime, when the voltage applied to the diffusion unit 307 is controlled so as to put the PDLC into the diffusion state, the light is diffused by the diffusion unit 307 and is output as the diffused light 103 that illuminates the entire room. That is, the light diffused by the diffusion unit 307 is widely projected from the diffusion unit 307 as compared with the light that passes through the diffusion unit 307.

Although the diffusion unit 307 is arranged behind the projection optical system 305 in the first embodiment, the present invention is not limited to the arrangement. The diffusion unit 307 may be arranged in any position as long as the diffusion unit 307 diffuses and transmits the light from the light source 301 and the diffused light and the transmitted light is projected from the projector 100. For example, the diffusion unit 307 may be arranged in front of the projection optical system 305.

Next, a fundamental operation process of the projector 100 will be described with reference to a flowchart in FIG. 4A.

When an AC power is supplied to the projector 100 through a power cable (not shown), the power is supplied to the controller 200, ROM 206, RAM 207, and communication unit 208, and the controller 200 starts and is put into a suspended state. When the controller 200 detects a start instruction from the user 101, the operation process in FIG. 4A starts.

Although the start instruction from the user 101 occurs by press of a power switch (not shown) provided in the body of the projector 100 in the first embodiment, the present invention is not limited to this. For example, press of the power button 210 of the operation terminal 104 detected via the communication unit 208 or a control command from another control device received via the communication unit 208 is usable as the start instruction from the user 101. Alternatively, detection of a predetermined gesture of the user 101 by a camera (not shown) provided in the projector 100 or detection of predetermined sound of the user 101 by a microphone (not shown) may be usable as the start instruction.

In step S100, the controller 200 executes a starting process for each part of the projector 100. Specifically, the controller 200 controls to supply the power to each part and sets the video input unit 202, image processing unit 203, panel drive unit 204, light source controller 300, optical system controller 304, and diffusion unit controller 306 to be available. Next, the controller 200 makes the light source 301 emit light and activates a cooling fan (not shown). Thereby, the projector 100 starts an operation in the projection mode in which an image input into the video input unit 202 is displayed as the projection image 102.

Next, the controller 200 executes a projection mode setting process in step S101. Furthermore, details of the process in the step S101 will be mentioned later with reference to FIG. 4B.

In the next step S102, the controller 200 obtains the operation instruction from the user 101 by referring to the communication unit 208.

In the next step S103, the controller 200 determines a content of the operation instruction obtained. When no operation instruction has been obtained, the process returns to the step S102. In the meantime, when the obtained operation instruction concerns a termination operation, the process proceeds to step S104. A press of the power button 210 of the operation terminal 104 is an example of the termination operation. When the obtained operation instruction concerns an input switching operation, the process proceeds to step S105. A press of the input switching button 217 of the operation terminal 104 is an example of the input switching operation. When the obtained operation instruction concerns a color switching operation, the process proceeds to step S106. A press of the color change button 219 of the operation terminal 104 is an example of the color switching operation. When the obtained operation instruction concerns a menu operation, the process proceeds to step S107. Presses of the menu button 211, decision button 216, up button 212, down button 213, left button 214, and right button 215 of the operation terminal 104 are examples of the menu operation. When the obtained operation instruction concerns a mode switching operation, the process proceeds to step S111. A press of the illumination-projection switching button 218 of the operation terminal 104 is an example of the mode switching operation. Although only the presses of the buttons of the operation terminal 104 are described as the examples of the operation instructions, other operations are also allowable. For example, a press of a switch button (not shown) on the body of the projector 100 or a control command from another control device via the communication unit 208 may be used as the operation instruction. Alternatively, detection of a predetermined gesture of the user 101 by the camera (not shown) or detection of predetermined sound of the user 101 by the microphone (not shown) may be usable as the operation instruction.

When determining that the operation instruction concerns the termination operation in the step S103, the controller 200 executes a termination process for each part of the projector 100 in the step S104. Specifically, the controller 200 gives an instruction to the light source controller 300 to stop emission of the light source 301, shuts down the power of each part of the projector 100 so that the power is supplied to only the controller 200, ROM 206, RAM 207, and communication unit 208. Thereby, the controller 200 returns to the suspended state and finishes this process.

In the meantime, when determining that the operation instruction concerns the input switching operation in the step S103, the controller 200 controls the video input unit 202 to switch an image input source of the video input unit 202 in the step S105. Specifically, the controller 200 switches between a first setting in which image data from an external device (not shown) is input into the video input unit 202 and a second setting in which image data designated by the controller 200 is input into the video input unit 202 every time when the step S105 is performed. This enables the user 101 to switch between the display of an image input from outside and the display of an image stored in the projector 100 beforehand by the input switching operation. The controller 200 may designate a white rectangular image or a white circular image, for example in the second setting. Thereby, the projector 100 radiates light having a spotlight effect. It should be noted that the image is stored in the ROM 206. Moreover, the alternate application of the first and second settings is one example. The settings may be switched by another method. For example, whenever the instruction for the input changing operation is received, three settings including the first setting, the second setting that designates the rectangular image, and the second setting that designates the circular image may be switched and applied in order. After that, the process returns to the step S102.

In the meantime, when determining that the operation instruction concerns the color switching operation in the step S103, the controller 200 designates gain correction values that are different in R, G, and B to the panel drive unit 204 so as to set for changing the color tone of the projected light. After that, the process returns to the step S102. Details of the setting in the step S106 will be mentioned later with reference to FIG. 8.

In the meantime, when determining that the operation instruction concerns a menu operation in the step S103, the controller 200 determines whether the current mode is the projection mode in the step S107. When the current mode is the projection mode, the process proceeds to step S108, otherwise the process returns to the step S102.

In the step S108, the controller 200 updates the menu image that is superimposed on an output image by the image processing unit 203. The contents of the update process differ according to a combination of the current superposition state of the menu image and detailed operation instructions.

Figure 5:
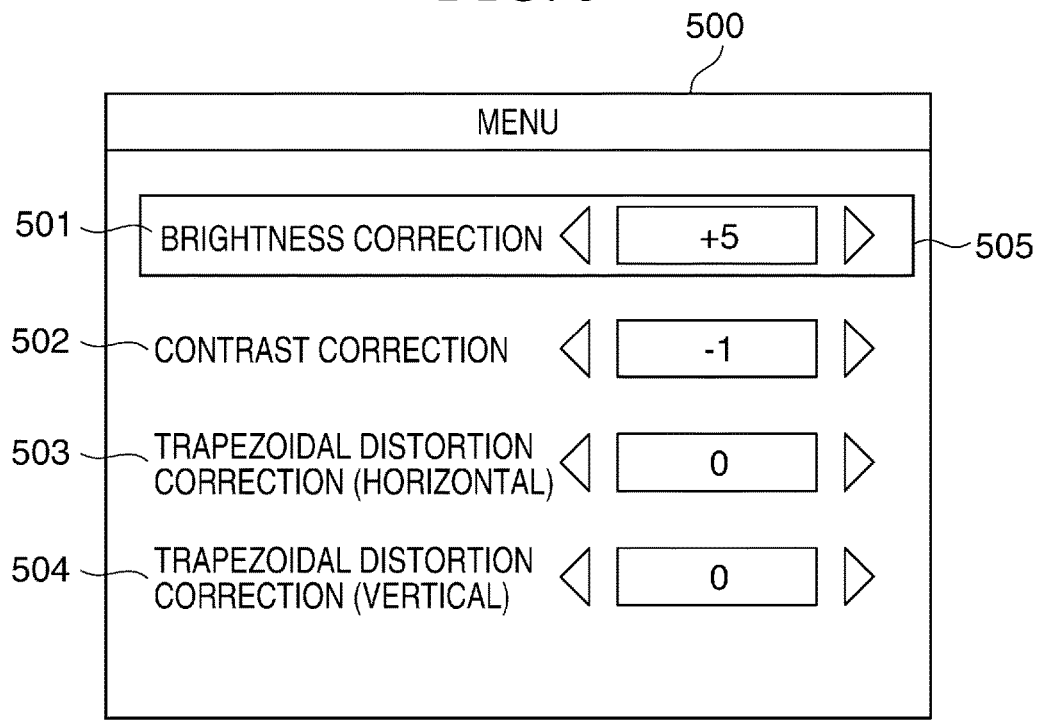
FIG. 5 is a view for describing a menu image that is superimposed on an input image.

Specifically, when the menu button 211 of the operation terminal 104 is pressed in the state where the menu image is not superimposed and displayed, the controller 200 instructs the image processing unit 203 to display a first menu image so as to superimpose on an output image. FIG. 5 shows an example of the first menu image that is displayed in response to the first superposition instruction. The menu image 500 has four setting items. A setting item 501 is an item for receiving instructions about brightness correction. A setting item 502 is an item for receiving instructions about contrast correction. A setting item 503 is an item for receiving instructions about trapezoidal distortion correction in the horizontal direction. A setting item 504 is an item for receiving instructions about trapezoidal distortion correction in the vertical direction. The current set values are displayed in the setting items 501 through 504. Moreover, a cursor 505 is displayed at a setting item that is currently subjected to an operation among the setting items 501 through 504. In the first embodiment, as shown in FIG. 5, the cursor 505 is displayed at the top setting item 501 when the menu image 500 is displayed first.

When the menu button 211 or the decision button 216 of the operation terminal 104 is pressed in the state where the menu image is superimposed and displayed, the controller 200 instructs the image processing unit 203 to erase the menu image from the output image.

When the up button 212 or the down button 213 of the operation terminal 104 is pressed in the state where the menu image is superimposed and displayed, the controller 200 determines that the operation is a movement instruction for the cursor 505. That is, the controller 200 generates a menu image in which the cursor 505 moves to the upper setting item or the lower setting item in response to the movement instruction and instructs the image processing unit 203 to superimpose and display.

When the left button 214 or the right button 215 of the operation terminal 104 is pressed in the state where the menu image is superimposed and displayed, the controller 200 determines that the operation is an increase/decrease instruction for the setting item on which the cursor 505 is located. That is, the controller 200 generates a menu image in which the set value of the setting item on which the cursor 505 is located increases or decreases according to the increase/decrease instruction and instructs the image processing unit 203 to superimpose and display.

In the next step S109, the controller 200 determines whether the user 101 requested a setting change. That is, it is determined whether increase/decrease is instructed to the set value of the setting item on which the cursor 505 is located in the menu image 500 updated in the step S108.

When the user requested a setting change, the process proceeds to the step S110. When there is no request, the process returns to the step S102.

In the step S110, the controller 200 updates the set value of the setting item on which the cursor 505 is located according to the request of the setting change and sends the updated set value to the image processing unit 203. After sending the set value, the process returns to the step S102.

In the meantime, when determining that the operation instruction concerns the mode switching operation in the step S103, the controller 200 checks the current mode in the step S111. When the current mode is the illumination mode, the process proceeds to the step S112. When the current mode is the projection mode, the process proceeds to the step S113.

In the step S112, the controller 200 executes the projection-mode setting process so as to put the diffusion unit 307 into the transmission state. It should be noted that details of the process in the step S112 will be mentioned later with reference to FIG. 4B. After that, the process returns to the step S102.

In the step S113, the controller 200 executes the illumination-mode setting process so as to put the diffusion unit 307 into the diffusion state. It should be noted that details of the process in the step S113 will be mentioned later with reference to FIG. 4C. After that, the process returns to the step S102.

Figure 4A:
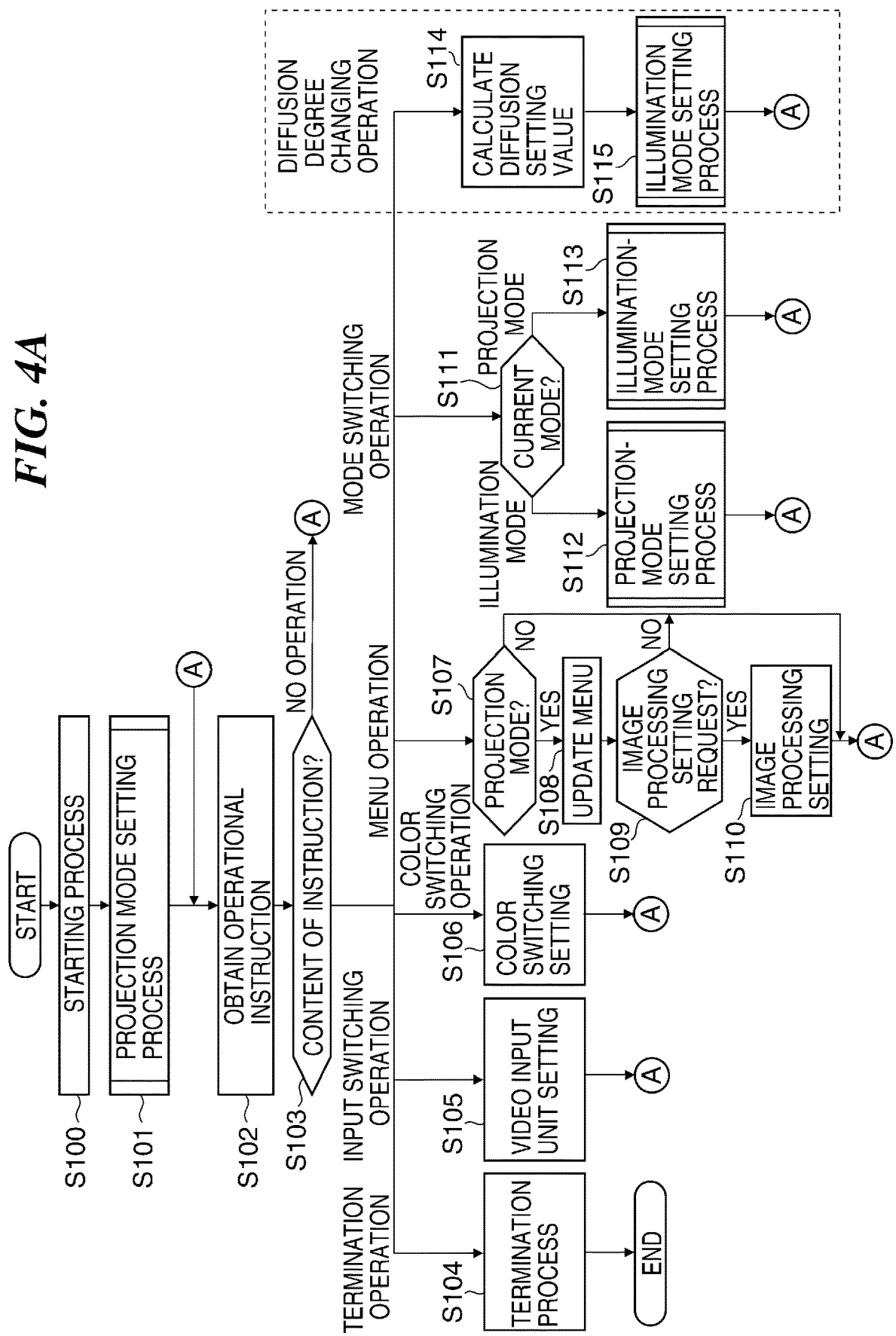
FIG. 4A is a flowchart showing procedures of an operation process in the projector according to the first and second embodiments.

It should be noted that steps inside a broken line in FIG. 4A are performed in the second embodiment mentioned later and are not performed in the first embodiment.

Fundamental operations of the projector 100 are achieved by the operation process shown in FIG. 4A described above. That is, for example, the user 101 is able to switch between start and termination of the projector 100 by pressing the power button 210 of the operation terminal 104. Moreover, for example, the user 101 is able to switch between the state where an input image from the outside is projected and appreciated and the state where a white rectangle image or a white circular image stored in the projector 100 is projected like a spotlight by pressing the input switching button 217 of the operation terminal 104. Moreover, for example, the user 101 is able to change the color tone of the light in the projection mode (projection image 102) or the diffused light 103 in the illumination mode by pressing the color change button 219 of the operation terminal 104. Moreover, for example, the user 101 is able to display a menu and change a desired setting by pressing the menu-related buttons 211 through 216 of the operation terminal 104. Moreover, for example, the user 101 is able to switch between the illumination mode and the projection mode by pressing the illumination-projection mode switching button 218 of the operation terminal 104. In the description, the illumination mode means the mode in which the diffused light 103 illuminates the room widely. Moreover, the projection mode means the mode in which the light (projection image 102) like the spotlight whose shape is clearly visible is projected.

Next, the projection mode setting process and the illumination mode setting process in the projector 100 will be described.

Figure 4B:
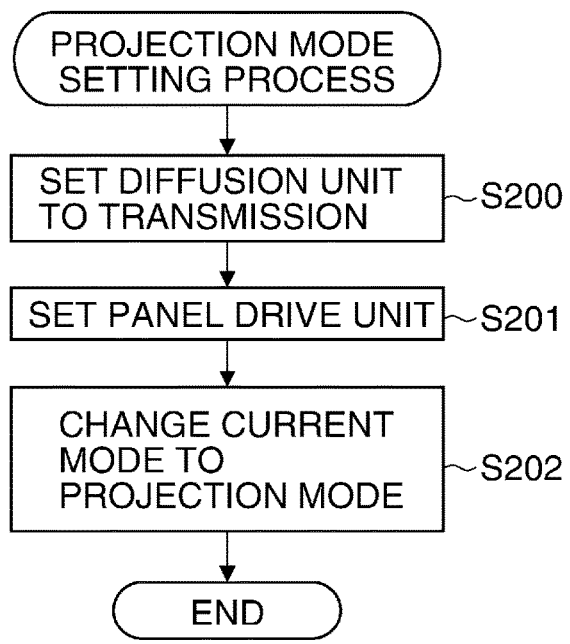
FIG. 4B and FIG. 4C are flowcharts showing details of a projection mode setting process in steps S101 and S112 in FIG. 4A and an illumination mode setting process in step S113 in FIG. 4A.

First, the details of the projection mode setting process executed in the steps S101 and S112 in FIG. 4A will be described with reference to FIG. 4B.

Figure 6A:
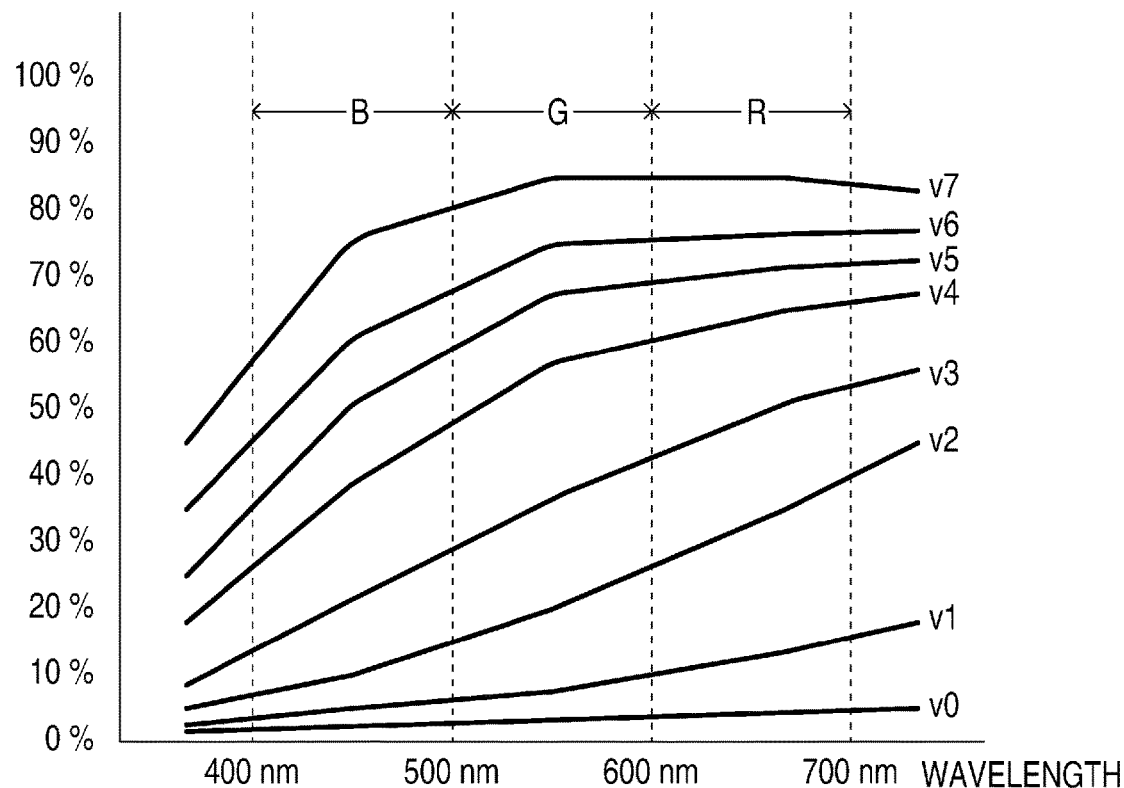
FIG. 6A and FIG. 6B are graphs for describing characteristics of a PDLC as a diffusion unit in FIG. 3.

At the beginning, the controller 200 issues an instruction to the diffusion unit controller 306 in step S200 so that the diffusion unit 307 controls to transmit light. A characteristic of the diffusion unit 307 in the first embodiment will be described with reference to FIG. 6A. FIG. 6A shows an example of the characteristic of the spectral transmittance of a PDLC as the diffusion unit 307 in the first embodiment. Moreover, the diffusion unit controller 306 applies voltages v0 through v7 to the diffusion unit 307 in order to control the transmittance. As shown in FIG. 6A, when the voltage v0 is applied to the diffusion unit 307, the transmittance is 10% or less in the wavelength band of visible light (about 400 nm through 700 nm). In other words, about 90% or more of the incident light to the diffusion unit 307 is diffused. Since a ratio of a component reflected by the surface of the diffusion unit 307 to the incident light to the diffusion unit 307 is so small that the component can be ignored, the reflection component is ignored in the first embodiment. In the meantime, when the voltage v7 is applied to the diffusion unit 307, the transmittance becomes about 60%, through 80% in the wavelength band of B (blue) and becomes about 80% or more in the wavelength band from G (green) to R (red). That is, in this case, about 20%, through 40% of the incident light to the diffusion unit 307 is diffused in the wavelength band of B (blue), and about 20% or less is diffused in the wavelength band from G (green) to R (red). As mentioned above, the spectral characteristics of the transmittance of the diffusion unit 307 vary according to the applied voltage. Moreover, relationship between the color of the light projected to the diffusion unit 307 and the color of the light output from the diffusion unit 307 varies according to the variation of the characteristics of the diffusion unit.

When the diffusion unit 307 having such a characteristic is used, the diffusion unit controller 306 controls to apply the voltage v7 to the diffusion unit 307 in the step S200 according to an instruction from the controller 200.

In the next step S201, the controller 200 issues an instruction to the panel drive unit 204 so as to set the gain correction values for correcting deviation of the color balance in the projection mode. The gain correction values in the first embodiment will be described with reference to FIG. 6A, FIG. 6B, FIG. 7A, and FIG. 7B.

Figure 6B:
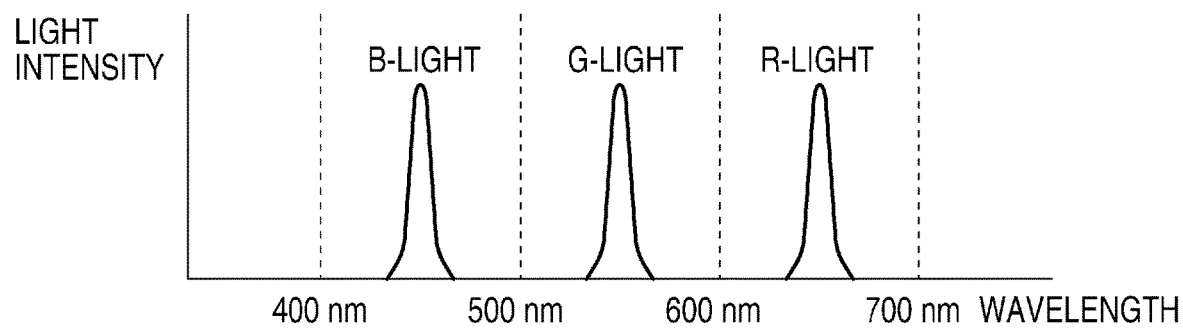

FIG. 6B shows an example of a spectral characteristic of light that is emitted from the light source 301 of the projector 100 and is separated into light components of RGB. The transmittances of the PDLC for the light components RGB at the voltages v0 through v7 are respectively found by integrating the products of the spectral characteristic in FIG. 6B and the spectral transmittances at the applied voltages v0 through v7 in FIG. 6A. The diffusivity is found by subtracting the transmittance from 100%. FIG. 7A shows examples of the transmittances and the diffusivities obtained in such a manner. Thus, transmittances and the diffusivities for the light components RGB are not balanced in any of the voltages v0 through v7 applied to the PDLC. For example, the transmittances at the voltage v7 are 75%, 84%, and 85% in the order of BGR. As compared with the white light in the case where there is no PDLC, the light that passed through the PDLC to which the voltage v7 is applied exhibits the RGB balance in which the B-light is less than each of the G-light and the B-light. That is, the light passing through the PDLC has yellow tint relatively. In order to balance the light components of RGB that pass through the PDLC or are diffused by the PDLC in FIG. 7A, correction processes of reverse characteristics are needed. The gain correction values for the correction are shown in FIG. 7B. For example, the gain correction values to the transmitted light components at the voltage v7 are 1.00, 0.89, and 0.88 in the order of BGR. When these gain correction values are multiplied by the transmittances at the voltage v7, transmittances become 75%*1.00=75% about B, 84%*0.89≈75% about G, and 85%*0.88≈75% about R, and the transmittances about RGB are balanced. In the step S201, the controller 200 sends the gain correction values corresponding to the transmitted light components at the voltage v7 applied to the PDLC to the panel drive unit 204. Furthermore, the characteristic data in FIG. 6A and FIG. 6B may be beforehand saved in the ROM 206 before shipment. In such a case, the controller 200 finds the transmittances (diffusivities) in FIG. 7A and the gain correction values in FIG. 7B by calculation on the basis of the saved data. Alternatively, the data about the transmittances (diffusivities) in FIG. 7A may be beforehand saved in the ROM 206 before shipment. In such a case, the controller 200 finds the gain correction values in FIG. 7B by calculation on the basis of the saved data. Alternatively, the gain correction values in FIG. 7B may be beforehand saved in the ROM 206 before shipment so that the controller 200 reads the values.

Although the projector 100 in the first embodiment uses the PDLC of the spectral characteristics shown in FIG. 7A, the present invention is applicable to a projector with a PDLC having other characteristics.

Although the first embodiment describes the example in which the panel drive unit 204 executes the correction processes that counteract the spectral characteristics of the PDLC, the present invention is not limited to such a configuration. The present invention is applicable to any process as long as the process individually changes the intensities of the RGB light components when the PDLC does not diffuse the light. For example, when the light source 301 consists of separate light sources for the light components RGB and the intensities of the output light components of RGB are individually controllable, the correction processes that counteract the spectral characteristics of the PDLC may be executed for the light source 301. Moreover, for example, the similar processes may be executed by a gain circuit or a gamma circuit in the image processing unit 203.

The first embodiment describes the example that balances the light components of RGB that are obtained by spectrally dispersing the white light from the light source 301 to be desired white color. However, the present invention is applicable to a projector with a light source having another spectral characteristic. In such a projector, new gain correction values may be calculated by multiplying gain correction values that counteract deviation of the color balance characteristic of the light source by gain correction values that counteract the spectral characteristics of the PDLC. Then, the panel drive unit 204 should execute correction processes with the new gain correction values in place of the correction processes that counteract the spectral characteristics of the PDLC. Moreover, when the light source 301 consists of separate light sources for the light components RGB and the intensities of the output light components of RGB are individually controllable, the correction processes may be executed for the light source 301 using the new gain correction values. Moreover, for example, the similar processes may be executed by a gain circuit or a gamma circuit in the image processing unit 203.

Finally, in step S202, a value that means the "projection mode" is stored in a region of the RAM 207 that shows the current mode so that the current mode will be discriminative, and this process is finished.

Figure 4C:
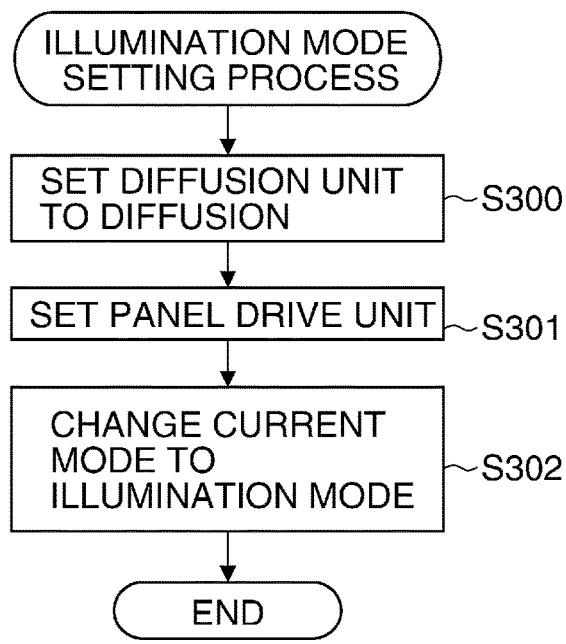

Next, the details of the illumination mode setting process executed in the steps S112 in FIG. 4A will be described with reference to FIG. 4C.

At the beginning, the controller 200 issues an instruction to the diffusion unit controller 306 in step S300 so that the diffusion unit 307 controls to diffuse light. For example, when the PDLC as the diffusion unit 307 has the spectral characteristics as shown in FIG. 6A as mentioned above, the controller 200 instructs the diffusion unit controller 306 to apply the voltage v0 at which the transmittance of the diffusion unit 307 becomes minimum in the step S300.

In the next step S301, the controller 200 issues an instruction to the panel drive unit 204 so as to set the gain correction values for correcting deviation of the color balance in the illumination mode. The gain correction values in the first embodiment will be described with reference to FIG. 7A, and FIG. 7B.

As mentioned above with reference to FIG. 7A, the diffusivities at the voltage v0 are 98%, 97%, and 96% in the order of BGR. As compared with the white light in the case where there is no PDLC, the color tone of the light that is diffused by the PDLC to which the voltage v0 is applied varies so as to exhibit the RGB balance in which the B-light is slightly less than the G-light and the G-light is slightly less than the R-light. That is, the light diffused by the PDLC has blue tint relatively. As mentioned above, FIG. 7B shows the gain correction values for correcting the deviation of the RGB balance of the light that passes through the PDLC or is diffused by the PDLC shown in FIG. 7A. For example, the gain correction values to the diffused light components at the voltage v0 are 0.98, 0.89, and 1.00 in the order of BGR. When these gain correction values are multiplied by the diffusivities at the voltage v0, corrected diffusivities become 98%*0.98=96% about B, 97%*0.99≈96% about G, and 96%*1.00=96% about R, and the corrected diffusivities about RGB are balanced. In the step S301, the controller 200 sends the gain correction values corresponding to the diffused light components at the voltage v0 applied to the PDLC to the panel drive unit 204.

Finally, in step S302, a value that means the "illumination mode" is stored in the region of the RAM 207 that shows the current mode so that the current mode will be discriminative, and this process is finished.

Moreover, as mentioned above, the controller 200 sets up the panel drive unit 204 for changing the color tone of the light (projection image 102) in the projection mode or the diffused light 103 in the illumination mode in the step S106 in FIG. 4A. Details of the setting will be described with reference to FIG. 8.

FIG. 8 is a table showing seven patterns of the setting. Gain correction values of RGB are defined for each of the serial numbers 0 through 6. Each of the gain correction values of RGB is referred to as a first correction value to simplify the description. For example, the first correction values corresponding to the serial number 4 are 0.0, 1.0, and 1.0 in the order of RGB. Whenever the process reaches the step S106, the controller 200 calculates the set values to the panel drive unit 204 on the basis of the first correction values corresponding to each of the serial numbers 0 through 6. This calculation method is described. First, the controller 200 obtains the gain correction values of RGB that were set to the panel drive unit 204 at the previous step S201 or step S301. Each of these values is referred to as a second correction value to simplify the description. For example, a case where the values of 1.00, 0.89, and 0.88 in the order of BGR were obtained as the second correction values will be described hereinafter. The controller 200 multiplies the first correction value by the second correction value for every RGB. A value obtained as a result is referred to as a third correction value. For example, the third correction values obtained by multiplying the first correction values by the second correction values corresponding to the serial number 4 become 0.0, 0.89, and 0.88 in the order of RGB. In the step S106, the controller 200 sets up the third correction values obtained in this way to the panel drive unit 204. Thereby, when the panel drive unit 204 is controlled by the color change setting in the step S106 on the basis of the correction values obtained in the step S201 or S301, the color tone of the light transmitted or diffused from the PDLC is changed into color other than white.

As described above, the RGB balance of the transmittances or the diffusivities of the projector 100 with the diffusion unit 307 may differ depending on the state (a transmission state or a diffusion state) of the diffusion unit 307. For example, the transmittances of the light components B, G, and R when the diffusion unit 307 is in the transmission state are 75%, 84%, and 85%, or example (see the transmittances corresponding to the voltage v7 in FIG. 7A), and the transmission amount of each of the components G and R is more than that of the component B. That is, the balance of the transmitted light through the PDLC in the case deviated toward yellow. In the meantime, the diffusivities of the light components B, G, and R when the diffusion unit 307 is in the diffusion state are 98%, 97%, and 96% (see the diffusivities corresponding to the voltage v0 in FIG. 7A), and the diffusion amount decreases in the order of BGR. That is, the balance of the diffused light through the PDLC in the case is deviated toward blue. However, when the present invention is applied, the deviations are corrected by the processes in the steps S201 and S301. For example, the projector 100 shall be controlled to display a white rectangle in the step S105 and the projection image 102 shall be used like a spotlight in the projection mode. Then, the using form shall be changed so that the projector 100 widely illuminates inside the room in the illumination mode immediately after that. The present invention is able to reduce the difference between the color tone of the spotlight (in the projection mode) and the color tone of the wide illumination light (in the illumination mode) into the room, for example. Moreover, the difference in the color tone between the light in the projection mode and the light in the illumination mode is reducible in not only white but also another color as described concerning the step S106.

Next, the second embodiment of the present invention will be described. The second embodiment differs from the first embodiment in a point that a diffusion degree is variable in a diffusion state (illumination mode). Hereinafter, difference from the first embodiment will be described.

A block configuration inside the projector 100 will be described with reference to FIG. 2. The second embodiment differs from the first embodiment in that the buttons inside the broken line in FIG. 2 are added to the operation terminal 104 described in the first embodiment.

A high diffusion button 220 is an operating member for receiving an instruction to increase the diffusion degree of the light ejected from the projector 100 from the user 101. A low diffusion button 221 is an operating member for receiving an instruction to decrease the diffusion degree of the light ejected from the projector 100 from the user 101.

Next, a fundamental operation process of the projector 100 according to the second embodiment will be described with reference to FIG. 4A. The second embodiment differs from the first embodiment in that the steps inside the broken line in FIG. 4A are added to the operation process described in the first embodiment.

In the second embodiment, when the obtained operation instruction concerns a diffusion-degree changing operation in the step S103, the process proceeds to the step S114. A press of the high diffusion button 220 or the low diffusion button 221 of the operation terminal 104 is an example of the diffusion-degree changing operation. Another operation may be the diffusion-degree changing operation. For example, a press of a switch button (not shown) on the body of the projector 100 or a control command received from another control device via the communication unit 208 may be used as the operation instruction. Alternatively, detection of a predetermined gesture of the user 101 by the camera (not shown) or detection of predetermined sound of the user 101 by the microphone (not shown) may be usable as the operation instruction.

When determining that the diffusion-degree changing operation was given in the step S103, the controller 200 calculates a set value of the diffusion degree on the basis of the operation content in step S114. Hereinafter, the step S114 is described in detail. The controller 200 prepares a variable d that shows the diffusion degree on the RAM 207. For example, the variable d shall take eight steps from 0 to 7, and 0 represents the maximum diffusion state and 7 represents the minimum diffusion state. Moreover, an initial value of the variable d at the start-up shall be 0. In the step S114, when the instruction to increase the diffusion degree like the press of the high diffusion button 220 is given, the controller 200 decreases the variable d. In the meantime, when the instruction to decrease the diffusion degree like the press of the low diffusion button 221 is given, the controller 200 increases the variable d.

In the next step S115, the controller 200 executes an illumination mode setting process in the diffusion state corresponding to the variable d that shows the diffusion degree. After that, the process returns to the step S102.

Hereinafter, the illumination mode setting process in the step S115 in the second embodiment will be described using the flowchart of the illumination mode setting process in FIG. 4C.

In the second embodiment, the step S300 is modified as follows. In the first embodiment, the example in which the controller 200 instructs the diffusion unit controller 306 to apply the voltage v0 to the diffusion unit 307 is described. In contrast to this, the controller 200 instructs the diffusion unit controller 306 to apply the voltage corresponding to the variable d that shows the diffusion degree in the second embodiment. For example, the controller 200 instructs to apply the voltage v2 in a case of d=2.

Moreover, the step S301 is modified as follows. In the first embodiment, the example in which the controller 200 sends the gain correction values for the transmitted light components when the voltage applied to the diffusion unit 307 is v0 to the panel drive unit 204 is described. In contrast to this, in the second embodiment, the controller 200 finds diffused-light oriented correction values corresponding to the diffusion degree (applied voltage to the diffusion unit 307) of the diffusion unit 307 from the table in FIG. 7B. For example, the gain correction values are 0.76, 0.85, and 1.00 in the order of BGR in a case of d=2 (applied voltage is v2).

Although the RGB balance of the diffused light components may be corrected irrespective of a light amount diffused by the diffusion unit 307 as the second embodiment, the RGB balance of the transmitted light components may be corrected when the diffused light is little. For example, since the light amounts of transmitted light components are little when the applied voltage is from v0 to v4, the diffused light components are corrected. That is, the diffused-light oriented correction values are used. In the meantime, since the light amounts of diffused light components are little when the applied voltage is from v5 to v7, the transmitted light components are corrected. That is, the transmitted-light oriented correction values are used. In this case, when the applied voltage is v5, the transmitted-light oriented correction values corresponding to v5 (i.e., the gain correction values 1.00, 0.83, and 0.74 in the order of BGR) are obtained with reference to FIG. 7B.

Moreover, the correction of the diffused light components and the correction of the transmitted light components may be switched by a method other than the above-mentioned method. For example, the menu screen may be constituted so that the user 101 is able to select light components to be corrected, and the setting may be switched according to the selection. Alternatively, the diffused light components may be corrected when the high diffusion button 220 was pressed at the last minute, and the transmitted light components may be corrected when the low diffusion button 221 was pressed at the last minute. Moreover, the diffused light components and the transmitted light components may be corrected with well balance. For example, a gain correction value may be calculated by calculating a weighted average of a diffused-light oriented correction value and transmission-light oriented correction value using light amounts of a diffused light component and transmitted light component as weights.

In the step S301, the controller 200 sends the calculated values found in this way to the panel drive unit 204. In addition, since the step S302 in the second embodiment is the same as that in the first embodiment, its description is omitted.

As described above, the RGB balance of the diffusivities of the PDLC varies depending on the diffusion degree when the projector 100 with the diffusion unit 307 is constituted so that the diffusion degree (applied voltage) of the diffusion unit 307 is variable in the illumination mode. For example, the diffusivities of the light components B, G, and R are 98%, 97%, and 96% when the voltage applied to the diffusion unit 307 is v0 (see the diffusivities corresponding to v0 in FIG. 7A). In contrast to this, the diffusivities of the light components B, G, and R are 90%, 80%, and 68% when the voltage applied to the diffusion unit 307 is v2 (see the diffusivities corresponding to v2 in FIG. 7A). That is, the balance of the diffused light components from the PDLC in the case of the applied voltage v2 inclines toward blue as compared with the case of the applied voltage v0. However, when the present invention is applied, such deviation is corrected properly because the gain correction values are set according to the diffusion degree in the step S301.

Next, a third embodiment of the present invention will be described. Unlike the first embodiment, the third embodiment does not have a PDLC. Hereinafter, difference from the first embodiment will be described.

Figure 3B:
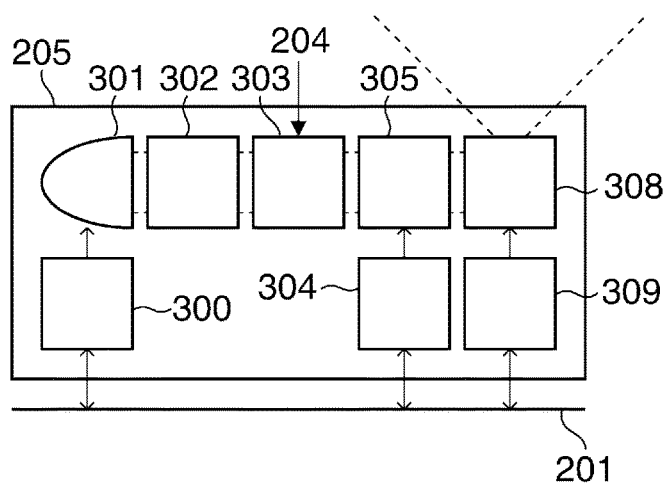

A difference from the first embodiment about a detailed configuration of a projection unit 205 of the third embodiment will be described with reference to FIG. 3B. The projection unit 205 in FIG. 3B is so configured that the diffusion unit 307 and the diffusion unit controller 306 in FIG. 3A described in the first embodiment are respectively replaced by a diffusion unit 308 and a diffusion unit controller 309. Since the other blocks are common, their descriptions are omitted.

Figure 9A:
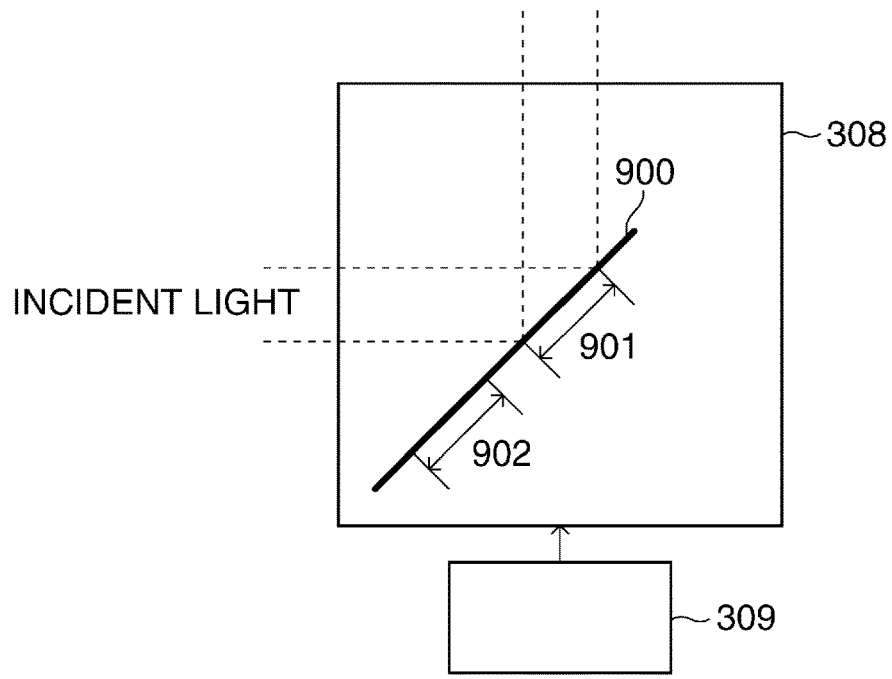
FIG. 9A and FIG. 9B are views for describing a configuration of a diffusion unit according to a third embodiment.
Figure 9B:
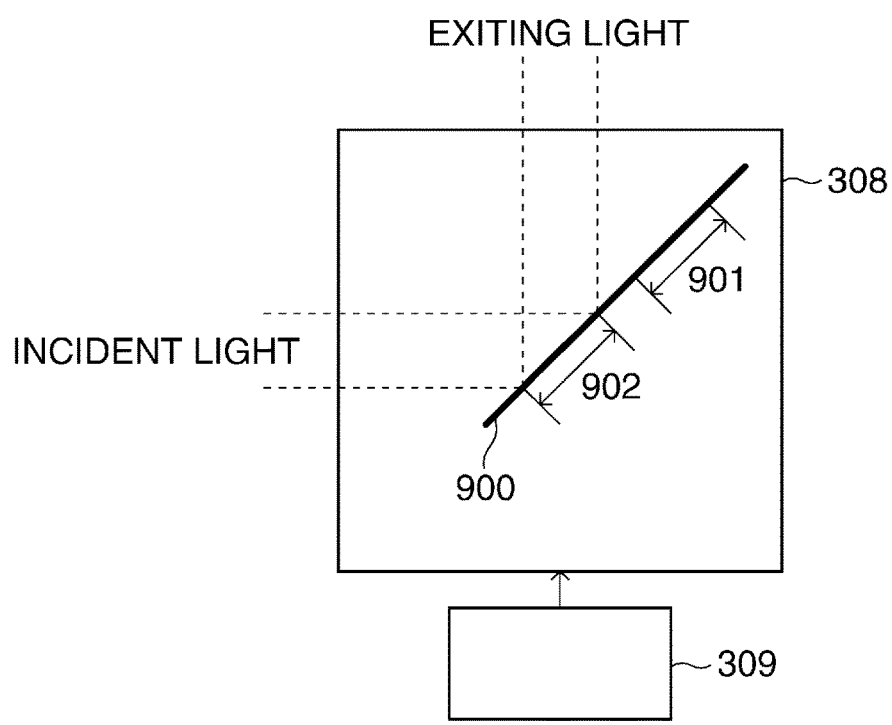

In the third embodiment, the diffusion unit 308 is a reflection-diffusion unit that consists of a movable mirror 900 shown in FIG. 9A and FIG. 9B.

The mirror 900 is movable between two positions shown in FIG. 9A and FIG. 9B under control of the diffusion unit controller 309. The mirror 900 has two areas. The first area 901 totally reflects incident light and ejects without diffusing. The first area 901 is irradiated with the incident light when the mirror 900 is in the position shown in FIG. 9A. The second area 902 diffuses and reflects the incident light because the surface is coated by diffusion material. The second area 902 is irradiated with the incident light when the mirror 900 is in the position shown in FIG. 9B. It should be noted that the area 902 is coated by fluorescent material in addition to the diffusion material.

According to such a configuration, the light that is reflected by the area 901 and ejects from the diffusion unit 308 is used for displaying the projection image 102 (in the projection mode) in the third embodiment. In the meantime, the light that is reflected by the area 902 and ejects from the diffusion unit 308 is used for illuminating the inside of the room (in the illumination mode) in the third embodiment. Accordingly, the coating of the fluorescent material to the area 902 widens a spectrum of the light ejected from the area 902, which improves a color rendering property needed to the projector 100 as lighting equipment.

Returning back to FIG. 3B, the diffusion unit controller 309 consists of an actuator and moves the mirror 900 included in the diffusion unit 308 between the position in FIG. 9A and the position in FIG. 9B. That is, the diffusion unit controller 309 enables switching between a total reflection mode (first mode) in which the mirror 900 is in the position in FIG. 9A and a complete diffusion mode (second mode) in which the mirror 900 is in the position in FIG. 9B (a switching unit).

Next, an operation process of the projector 100 according to the third embodiment will be described with reference to FIG. 4A. In the third embodiment, the operation process described in the first embodiment is modified as follows.

The process for the diffusion unit 307 is modified into a process for the diffusion unit 308 first. Moreover, the process for the diffusion unit controller 306 is modified into a process for the diffusion unit controller 309. In connection with them, the projection mode is defined as a mode in which the light that is reflected by the first area 901 on the mirror 900 of the diffusion unit 308 ejects outside without diffusing. Moreover, the illumination mode is defined as a mode in which the diffused light that is reflected by the area 902 on the mirror 900 of the diffusion unit 308 ejects outside.

Hereinafter, the projection mode setting process in the third embodiment will be described with reference to FIG. 4B. In the third embodiment, the projection mode setting process described in the first embodiment is modified as follows.

First, the step S200 is modified as follows. The controller 200 issues an instruction to the diffusion unit controller 309 so that the light will be incident on the area 901 of the mirror 900 of the diffusion unit 308. A characteristic of the diffusion unit 308 in the third embodiment will be described with reference to FIG. 7C. FIG. 7C shows reflectances for RGB in the areas 901 and 902 of the mirror 900 of the diffusion unit 308. All the reflectances for RGB are 100% when the light is incident on the area 901, and the RGB balance is well.

Moreover, the step S201 is modified as follows. The controller 200 issues an instruction to the panel drive unit 204 so as to set the gain correction values for correcting the color balance in the projection mode. The gain correction values in the third embodiment will be described with reference to FIG. 7D. Since the RGB balance of the reflectances in the area 901 is well as mentioned above, the gain correction values corresponding to the area 901 in FIG. 7D are 1.00. The controller 200 sends the obtained gain correction values to the panel drive unit 204.

In addition, since the step S202 in the third embodiment is the same as that in the first embodiment, its description is omitted.

Next, the illumination mode setting process in the third embodiment will be described with reference to FIG. 4C. In the third embodiment, the illumination mode setting process described in the first embodiment is modified as follows.

First, the step S300 is modified as follows. The controller 200 issues an instruction to the diffusion unit controller 309 so that the light will be incident on the area 902 of the mirror 900 of the diffusion unit 308. A characteristic of the diffusion unit 308 in the third embodiment will be described with reference to FIG. 7C. FIG. 7C shows reflectances for RGB in the areas 901 and 902 of the mirror 900 of the diffusion unit 308. The reflectances for RGB are 98%, 102%, and 103% when the light is incident on the area 902, and the RGB balance inclines toward yellow. It should be noted that the characteristic of the reflective member that constitutes the area 902 or the fluorescent material coated for improving the color rendering property may be a factor that inclines the RGB balance.

Moreover, the step S301 is modified as follows. The controller 200 issues an instruction to the panel drive unit 204 so as to set the gain correction values for correcting the color balance in the illumination mode. The gain correction values in the third embodiment will be described with reference to FIG. 7D. As mentioned above, the RGB balance of the reflectances in the area 902 is deviated. In order to correct the RGB balance, correction processes of reverse characteristics are needed. The gain correction values for the correction are shown in FIG. 7D. For example, the gain correction values in this case are 1.00, 0.96, and 0.95 in the order of BGR. When these gain correction values are multiplied by the reflectances of RGB of the area 902, corrected reflectances become 98%×1.00=98% about B, 102%×0.96≈98% about G, and 103%×0.95≈98% about R. Thereby, the corrected reflectances of RGB are balanced. The controller 200 sends the gain correction values to the panel drive unit 204.

The data about the reflectivities in FIG. 7C may be beforehand saved in the ROM 206 before shipment. In such a case, the controller 200 finds the gain correction values in FIG. 7D by calculation on the basis of the saved data. Alternatively, the gain correction values in FIG. 7D may be beforehand saved in the ROM 206 before shipment so that the controller 200 reads the values.

Although the third embodiment describes the example that uses the reflective members with reflection characteristics shown in FIG. 7C for the mirror 900, the present invention is applicable even to a case where the projector 100 has reflective members with other characteristics as the mirror 900.

Although the third embodiment describes the example in which the panel drive unit 204 executes the correction processes that counteract the spectral characteristics of the reflective members that constitute the mirror 900, the present invention is not limited to such a configuration. The present invention is applicable to any processes as long as the intensities of the RGB light components are individually changeable in the processes. For example, when the light source 301 consists of separate light sources for the light components RGB and the intensities of the output light components of RGB are individually controllable, the correction processes that counteract the spectral characteristics of the reflective members may be executed for the light source 301. Moreover, for example, the similar processes may be executed by a gain circuit or a gamma circuit in the image processing unit 203.

As described above, the RGB balance of the light components ejected from the diffusion unit 308 varies depending on the mode (the total reflection mode or the complete diffusion mode) of the diffusion unit 308 in the projector 100 with the diffusion unit 308 according to the third embodiment. However, when the present invention is applied, the RGB balance is properly corrected by executing the different correction processes corresponding to the modes using FIG. 7C and FIG. 7D.

Next, a fourth embodiment of the present invention will be described. The fourth embodiment differs from the first embodiment in that the light from the light source 301 does not pass the liquid crystal panel 303 in the illumination mode. Hereinafter, difference from the first embodiment will be described.

Figure 3C:
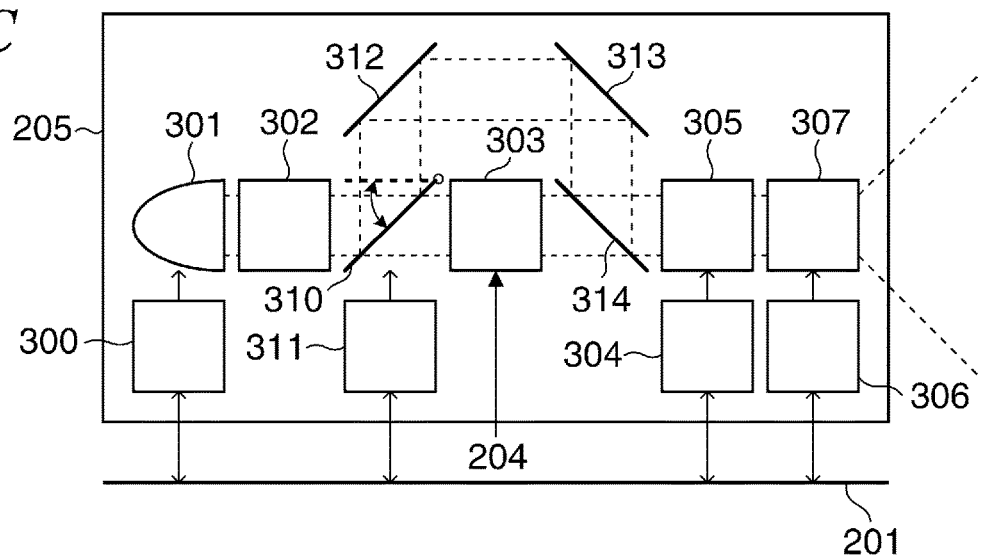

A difference from the first embodiment about a detailed configuration of a projection unit 205 of the fourth embodiment will be described with reference to FIG. 3C. The projection unit 205 in FIG. 3C is configured by modifying the projection unit 205 in FIG. 3A described in the first embodiment by adding members. The description about the common members with the configuration in FIG. 3A is omitted, and modified points will be described.

The light source 301 is modified so as to consist of three partial light sources of RGB.

The light source controller 300 is modified so that the emission amounts of the partial light sources of RGB of the light source 301 are controlled independently according to instructions from the controller 200.

A mirror 310 is added. The mirror 310 is movable and switches between a state where the light from the illumination optical system 302 is incident on the liquid crystal panel 303 and a state where the light is incident on a below-mentioned mirror 312.

A mirror controller 311 is added. The mirror controller 311 consists of an actuator and operates the mirror 310 according to an instruction from the controller 200.

The mirror 312 and a mirror 313 are added. These mirrors reflect the light from the mirror 310 to guide to the mirror 314.

The mirror 314 is added. The mirror 314 transits the light from the liquid crystal panel 303 and reflects the light from the mirror 313, so that any light is guided to the projection optical system 305.

Next, an operation process of the projector 100 according to the fourth embodiment will be described with reference to FIG. 4A. In the fourth embodiment, only the step S106 in the operation process described in the first embodiment is modified as follows.

That is, the step S106 is modified so that gain correction values set to the panel drive unit 204 are set to the light source controller 300 similarly.

The projection mode setting process in the fourth embodiment will be described with reference to FIG. 4B. In the fourth embodiment, the projection mode setting process described in the first embodiment is modified as follows.

First, the step S200 is modified as follows. The controller 200 instructs the mirror controller 311 to remove the mirror 310 from the optical path and controls so that the light from the illumination optical system 302 will be incident on the liquid crystal panel 303.

Moreover, the step S201 is so modified that gain correction values are set up to either the panel drive unit 204 or the light source controller 300.

When gain correction values are set up to the light source controller 300, the gain correction values shown in FIG. 7B used in the correction process that counteracts the characteristics of the PDLC on the basis of the data showing the transmittances and the diffusivities of the PDLC for RGB shown in FIG. 7A are used. Thereby, in the fourth embodiment, the light components from the three partial light sources of RGB that constitutes the light source 301 are corrected, and the spectral characteristics of the light after exiting the PDLC are balanced between RGB.

Next, the illumination mode setting process in the fourth embodiment will be described with reference to FIG. 4C. In the fourth embodiment, the illumination mode setting process described in the first embodiment is modified as follows.

First, the step S300 is modified as follows. The controller 200 instructs the mirror controller 311 to insert the mirror 310 into the optical path and controls so that the light from the illumination optical system 302 will be incident on the mirror 312. That is, the light from the illumination optical system 302 is incident on the projection optical system 305 without being incident on the liquid crystal panel 303.

Moreover, the step S301 is so modified that no gain correction value is set to the panel drive unit 204 but the gain correction values are set to the light source controller 300.

As described above, the present invention is applicable to the case where the light from the light source 301 does not pass through the liquid crystal panel 303 similarly like the projector 100 in the fourth embodiment, and the similar effect is obtained.

It should be noted that the example of the case where the color balance between the light components from the three partial light sources of RGB that constitutes the light source 301 becomes desired white is described in the fourth embodiment. However, the present invention is applicable to a projector with a light source having another spectral characteristic. In such a projector, new gain correction values may be calculated by multiplying gain correction values that counteract deviation of the color balance characteristic of the light source by gain correction values that counteract the spectral characteristics of the PDLC. Then, the panel drive unit 204 or the light source controller 300 should execute correction processes with the new gain correction values in place of the correction processes that counteract the spectral characteristics of the PDLC.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-172290, filed Sep. 7, 2017, which is hereby incorporated by reference herein in its entirety.

What is claimed is:

1. A projection apparatus comprising:
   an irradiation unit configured to irradiate with light including a plurality of color components;
   a modulation unit configured to modulate the light irradiated by the irradiation unit;
   a diffusion unit configured to diffuse and output the light incident from the modulation unit; and
   a controller configured to set a target color of the light output from the diffusion unit and to control the irradiation unit and the modulation unit,
   wherein the controller controls at least one of the irradiation unit and the modulation unit according to a variation of characteristics of the diffusion unit so as to decrease a difference between a color of the light diffused by the diffusion unit and the target color.

2. The projection apparatus according to claim 1, wherein relationship between the color of the light projected to the diffusion unit and the color of the light output from the diffusion unit varies according to the variation of the characteristics of the diffusion unit.

3. The projection apparatus according to claim 1, wherein the diffusion unit is a transmission-diffusion unit that diffuses a part of the light incident from the modulation unit and transmits other part of the light,
   wherein the controller controls at least one of the irradiation unit and the modulation unit so that the color of the light projected to the transmission-diffusion unit becomes a first color when the transmittance of the transmission-diffusion unit is a first transmittance, and
   wherein the controller controls at least one of the irradiation unit and the modulation unit so that the color of the light projected to the transmission-diffusion unit becomes a second color when the transmittance of the transmission-diffusion unit is a second transmittance.

4. The projection apparatus according to claim 1, wherein the controller controls the irradiation unit according to the variation of the characteristics of the diffusion unit so that as to decrease a difference between the color of the light diffused by the diffusion unit and the target color.

5. The projection apparatus according to claim 1, wherein the controller controls the modulation unit according to the variation of the characteristics of the diffusion unit so as to decrease a difference between the color of the light diffused by the diffusion unit and the target color.

6. The projection apparatus according to claim 3, wherein the controller is configured to control the characteristics of the transmission-diffusion unit by controlling voltage applied to the transmission-diffusion unit,
   wherein the controller controls at least one of the irradiation unit and the modulation unit so that the color of the light projected to the transmission-diffusion unit becomes a first color when a first voltage is applied to the transmission-diffusion unit, and wherein the controller controls at least one of the irradiation unit and the modulation unit so that the color of the light projected to the transmission-diffusion unit becomes a second color when a second voltage is applied to the transmission-diffusion unit.

7. The projection apparatus according to claim 1, wherein the diffusion unit is a reflection-diffusion unit having a first area that exits the incident light without diffusing and a second area that diffuses and reflects the incident light, and wherein the controller controls the reflection-diffusion unit so that the incident light irradiates one of the first area and the second area, and wherein the controller controls at least one of the irradiation unit and the modulation unit so as to decrease a difference between the color of the light diffused by the reflection-diffusion unit and the target color when the projected light irradiates the second area of the reflection-diffusion unit.

8. The projection apparatus according to claim 3, wherein the transmission-diffusion unit transmits at least a part of the incident light as first light and diffuses other than the at least a part of the light as second light, and wherein the second light widely exits from the transmission-diffusion unit in comparison with the first light.

9. The projection apparatus according to claim 1, wherein the controller is configured to set one of an illumination mode and a projection mode and to switch the light incident on the diffusion unit between the light modulated by the modulation unit and the light irradiated by the irradiation unit, and wherein the controller controls the light modulated by the modulation unit to be incident when the projection mode is set, and the controller controls the light irradiated by the irradiation unit to be incident when the illumination mode is set.

10. A control method for a projection apparatus equipped with an irradiation unit that irradiates with light including a plurality of color components, a modulation unit that modulates light irradiated by the irradiation unit, and a diffusion unit that diffuse and output light incident from the modulation unit, the control method comprising:

setting a target color of the light output from the diffusion unit; and controlling at least one of the irradiation unit and the modulation unit according to a variation of characteristics of the diffusion unit so as to decrease a difference between a color of the light diffused by the diffusion unit and the target color.

11. A non-transitory computer-readable storage medium storing a control program causing a computer to execute a control method for a projection apparatus equipped with an irradiation unit that irradiates with light including a plurality of color components, a modulation unit that modulates light irradiated by the irradiation unit, and a diffusion unit that diffuse and output light incident from the modulation unit, the control method comprising:

setting a target color of the light output from the diffusion unit; and controlling at least one of the irradiation unit and the modulation unit according to a variation of characteristics of the diffusion unit so as to decrease a difference between a color of the light diffused by the diffusion unit and the target color.

* * * * *